Figure 1:
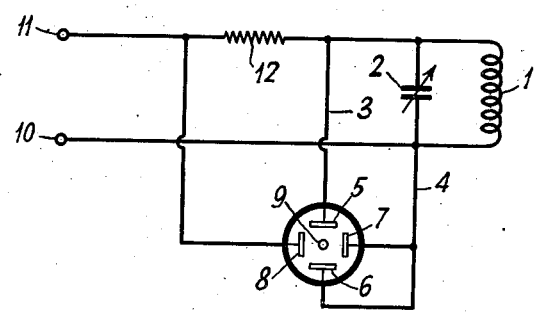

Aug. 26, 1941.  G. M. WRIGHT ET AL  2,254,023

FREQUENCY INDICATING INSTRUMENT

Filed Dec. 13, 1938

INVENTORS
GEORGE MAURICE WRIGHT
CYRIL AUSTIN
BY
ATTORNEY

Patented Aug. 26, 1941

2,254,023

UNITED STATES PATENT OFFICE 2,254,023

FREQUENCY INDICATING INSTRUMENT

George Maurice Wright, Woodham Ferrers, and Cyril Austin, Stockwell, London, England, assignors to Radio Corporation of America, a corporation of Delaware Application December 13, 1938, Serial No. 245,454
In Great Britain January 1, 1938

3 Claims. (Cl. 250—39)

This invention relates to wave meters and other frequency indicating instruments adapted for use for indicating the frequency of radio and other high frequency currents, and has for its object to provide improved frequency indicating instruments of high effective discrimination and therefore capable of being read to a high degree of closeness.

The at present usual form of frequency indicating instrument employed for measuring the frequency of currents in radio telegraph and telephone apparatus, consists essentially of a carefully calibrated adjustable parallel tuned circuit (either the inductance or the capacity or both, of this circuit may be variable) and a voltage responsive indicator connected across it or, alternatively, a current responsive indicator connected in series with it. In use the calibrated circuit is adjusted to resonance, this operation being performed with the aid of the indications given by the voltage or current responsive indicator, as the case may be, and the frequency determined from a knowledge of the calibration of the tuned circuit.

This type of instrument possesses the defect that its effective discrimination—i. e. its discrimination at the point at which it is read, namely resonance—is at a minimum, for at resonance the rate of change of indication given by the indicator per unit of change of the constants of the tuned circuit, is a minimum. In fact, at resonance, the tangent to the curve connecting adjustment of the tuned circuit with frequency is parallel to the frequency axis.

The principal object of the present invention is to avoid this defect and the invention achieves this object by utilizing the fact that, at resonance, the rate of change of phase of the total current passing through a resonant oscillatory circuit relative to the phase of the applied E. M. F. is substantially at a maximum as the frequency is changed.

According to this invention a wave meter or other frequency indicating instrument comprises an oscillatory circuit, an oscillograph capable of deflection in two angularly related directions, means responsive to the voltage effect produced by the rate of change of the total phase of current passing through said oscillatory circuit for producing deflection in one direction in said oscillograph and means responsive to the E. M. F. of the frequency to be indicated for producing deflection in the other direction in said oscillograph.

Preferably the oscillograph is a cathode ray tube having a fluorescent screen and mutually perpendicular ray deflection means e. g. mutually perpendicular pairs of electrostatic deflecting plates.

Figure 2:
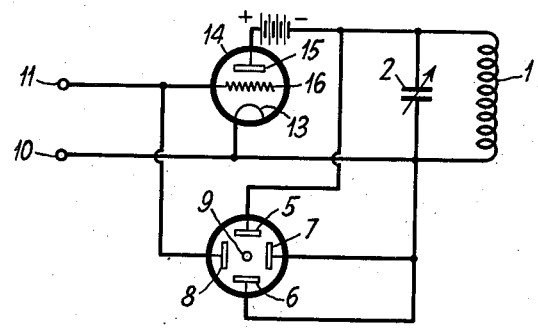
Figure 3:
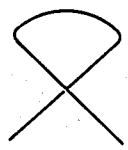
Figure 4:
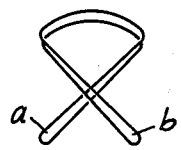

The invention is illustrated in and further explained in connection with the accompanying drawing, in which Fig. 1 shows one embodiment of my invention,
Fig. 2 shows a second embodiment, and
Figs. 3 and 4 are explanatory curves.

Referring to Fig. 1 which shows diagrammatically one way of carrying out the invention, a frequency indicating instrument comprises a calibrated adjustable circuit comprising an inductance 1 and a condenser 2 in parallel. The circuit 1, 2 is connected by leads 3, 4 between one pair 5, 6 of electrostatic deflecting plates of a cathode ray tube of the fluorescent screen type and having two mutually perpendicular pairs 5, 6 and 7, 8 of deflecting plates. The "gun" of the tube is represented by the dot 9. The input terminals 10, 11 of the instrument are connected one (10) directly to one end of the tuned circuit and the other (11) through an impedance 12 to the other end. The impedance 12 is of a value comparable to the impedance of the parallel tuned circuit at resonance. The input terminals 10, 11 are connected as shown to the other pair 7, 8 of deflecting plates.

With this arrangement, if the voltages fed to the two pairs of deflecting plates are equal in amplitude and the impedance is pure resistance, the pattern traced out by the cathode ray on the fluorescent screen will vary from a nearly circularly pattern, when the frequency applied at the input terminals is materially different from the resonant frequency of the tuned circuit, to a straight line making an angle of 45° to the direction of separation of the deflecting plates of either pair, when the input frequency is equal to the resonant frequency of the tuned circuit. For positions of even very slight mistune on either side of the resonance position this straight line becomes a narrow ellipse—a form of change which is easily observable—so that the resonance condition can be observed with great closeness.

In the modification shown diagrammatically in Fig. 2 one end of the tuned circuit 1, 2 is connected to one input terminal 10 and to the cathode 13 of a thermionic valve 14 while the other end thereof is connected to the anode 15 of the valve, the grid 16 being connected to the remaining input terminal 11. One pair 7, 8 of deflecting plates is connected across the input terminals 10, 11 and the other across the tuned circuit 1, 2. With this arrangement the pattern on the screen will, at resonance, be a straight line, but for even very small departures from resonance, the straight line will become a narrow ellipse.

It has been found possible, in experimental practice with indicator instruments in accordance with this invention and using quite normal oscillatory circuits having a "Q" value of the order of 200 or less to obtain an indication of frequency to within 1 part in 10,000.

The tuned circuit 1, 2 in either of the embodiments illustrated will normally be tuned to resonate at the frequency applied at 10, 11 but this is not a necessary condition since frequency indication can still be obtained if a harmonic relationship exists between the input frequency and the frequency of the circuit 1, 2. When such harmonic relationship so exists a "Lissajou" figure without loops will appear on the tube screen, the loops disappearing exactly as the harmonic condition is reached but appearing for slight mistuning on either side of the condition. Different harmonics give different "Lissajou" figures but the results obtained are typified by Figs. 3 and 4 in which Fig. 3 shows a figure (without loops) obtained on the tube screen exactly at a harmonic relation while Fig. 4 shows at *a* and *b* loops which appear at slight mistunings of 1, 2 away from the exact harmonic condition.

What we claim is:

1. A wave meter comprising a parallel tuned circuit, an oscillograph capable of deflection in two angularly related directions, a connection including an impedance between one terminal of said tuned circuit and one input terminal of the wave meter, a connection between the other terminal of said tuned circuit and the other terminal of the wave meter, means for applying voltage set up across the tuned circuit to the means for producing deflection in one direction in said oscillograph and means for applying the voltage at the input terminals to the means for producing deflection in the other direction in said oscillograph.

2. A wave meter comprising a parallel tuned circuit, an oscillograph capable of deflection in two angularly related directions, a valve having its anode-cathode space connected across said tuned circuit and its grid-cathode space connected across the input terminals of the wave meter, means for applying voltage set up across the tuned circuit to the means for producing deflection in one direction in said oscillograph, and means for applying the voltage at the input terminals to the means for producing deflection in the other direction in said oscillograph.

3. Apparatus in accordance with claim 1, wherein said impedance included in the connection between one terminal of said tuned circuit and one input terminal of said wave meter comprises a resistance.

GEORGE MAURICE WRIGHT.
CYRIL AUSTIN.